March 24, 1964
M. ZAJAC
3,125,773
THREAD TAPPING MECHANISM WITH MEANS TO
HOLD TAP IN PREDETERMINED ANGULAR AND
AXIAL RELATIONSHIP TO WORKHOLDER
Filed Dec. 26, 1962
2 Sheets-Sheet 1
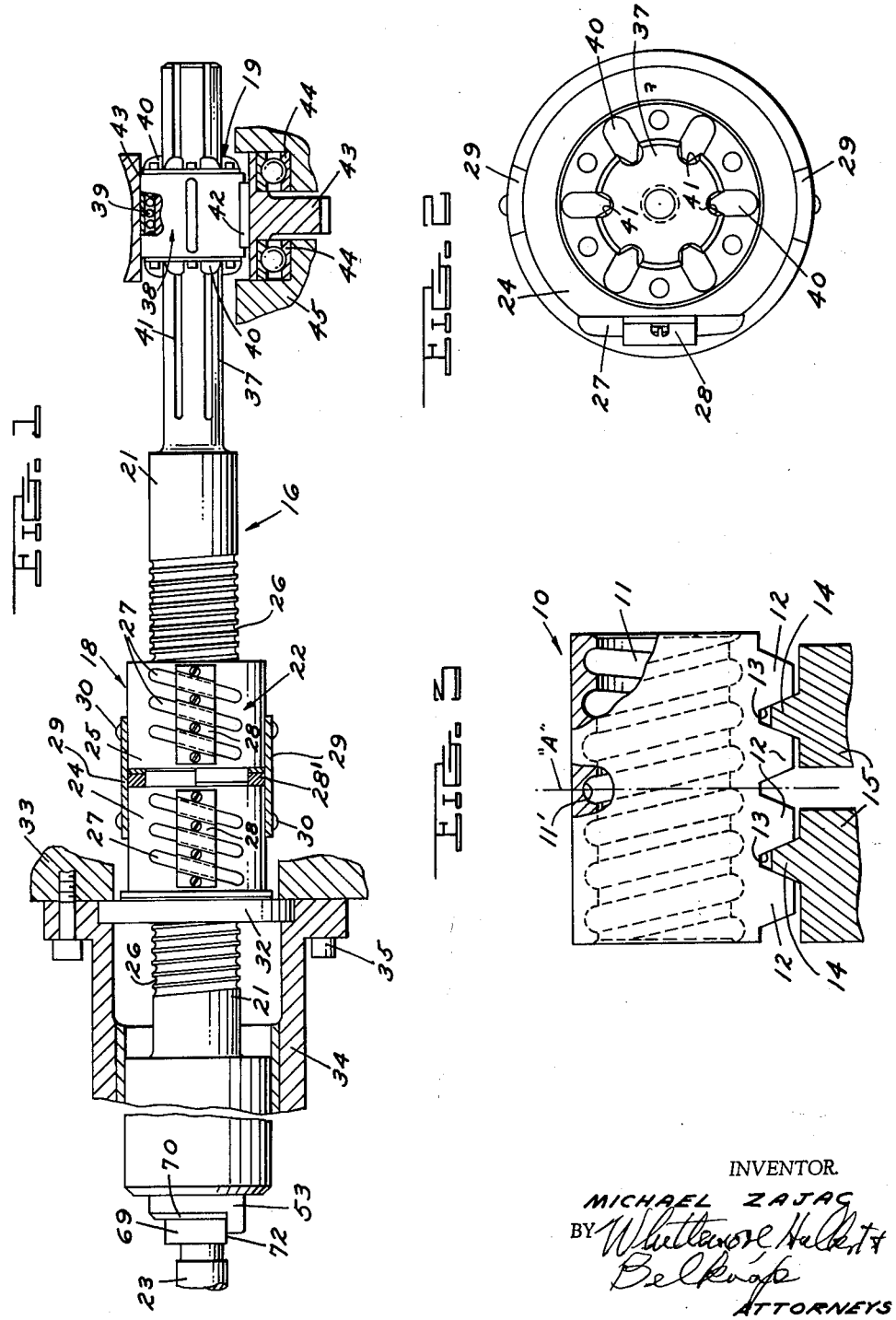
INVENTOR.
MICHAEL ZAJAC
BY
ATTORNEYS March 24, 1964 M. ZAJAC 3,125,773
THREAD TAPPING MECHANISM WITH MEANS TO
HOLD TAP IN PREDETERMINED ANGULAR AND
AXIAL RELATIONSHIP TO WORKHOLDER
Filed Dec. 26, 1962 2 Sheets-Sheet 2
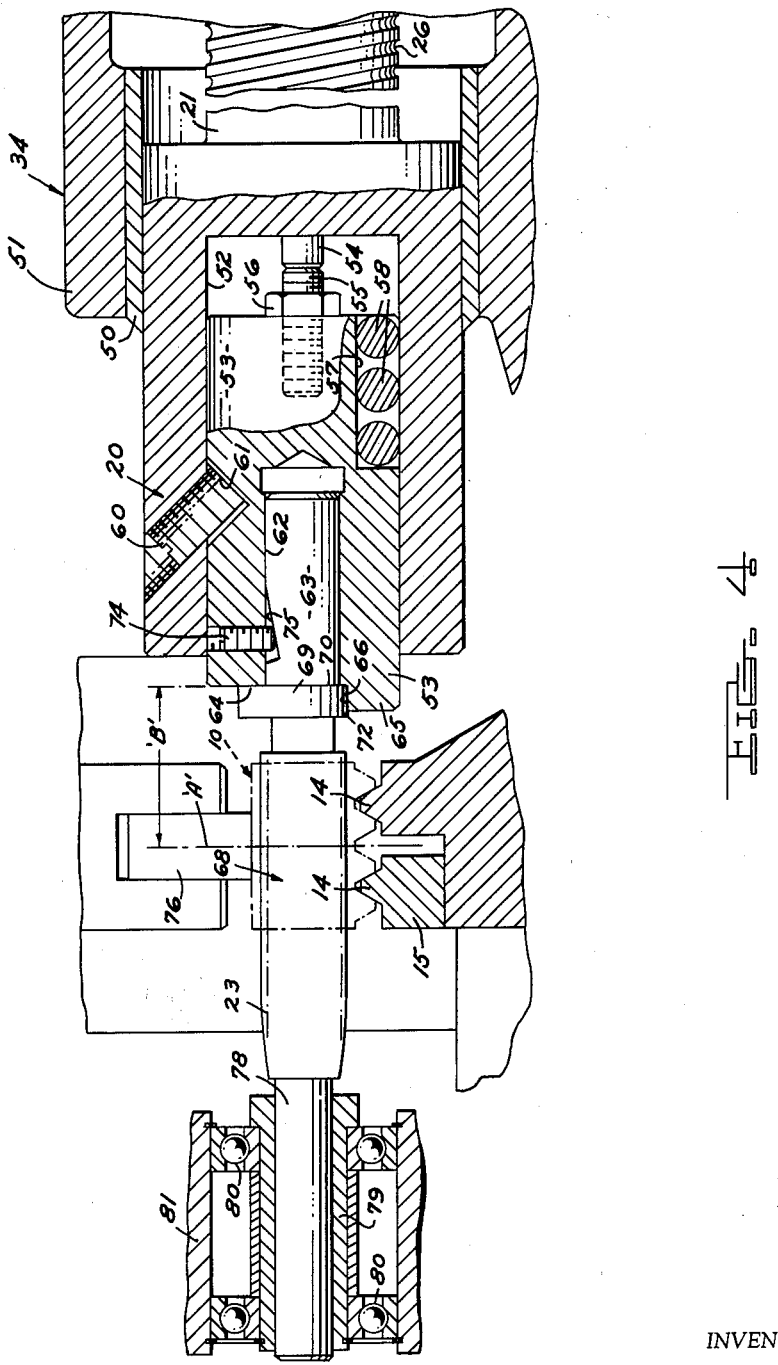
INVENTOR.
MICHAEL ZAJAC
BY Whitemore, Hulbert
Belknap
ATTORNEYS

United States Patent Office 3,125,773
Patented Mar. 24, 1964

3,125,773
THREAD TAPPING MECHANISM WITH MEANS TO HOLD TAP IN PREDETERMINED ANGULAR AND AXIAL RELATIONSHIP TO WORKHOLDER
Michael Zajac, Inkster Village, Mich., assignor to Buhr Machine Tool Company, Ann Arbor, Mich., a corporation of Michigan
Filed Dec. 26, 1962, Ser. No. 246,900
7 Claims. (Cl. 10—139)

The present invention relates to an improved thread tapping mechanism, and more particularly to a mechanism for forming the threading of a ball nut housing.

Various procedures are followed in the manufacture of such threads, one involving steps of internal rough hobbing the thread formation, then a finish tapping to clean the thread, heat treating and finish grinding on an internal thread grinder. Another procedure to which the present invention relates, utilizes progressive rough, semi-finish and finish tapping operations, followed by heat treating and grinding. The taps employed in the forming of ball nut threads according to this method are extremely expensive, costing in the neighborhood of $500.00 per set of three. This considerably exceeds the cost of taps for a regular thread other than a ball nut type, because of the need for precise tooth contour in the latter. Accordingly, it is seen to be very important that provisions be made to insure the longest possible life of the tap set.

Thread tapping means heretofore employed provide for the axial advance of the tap under screw feed, the tap being driven by a shaft or spindle having a thread engaged and guided in a fixed bronze nut for the advance of the tool.

Other means are employed also, such as that of bringing in the tap by means of a combination drive consisting of a gear train and a master lead screw. Here the spindles are rotated by a gear train; and the whole spindle cluster advanced by a single screw. However, inaccuracies are bound to arise due to the impossibility of accurately co-ordinating spindle rotative speed and axial feed, the factors of gear tooth wear and resultant lash, varying gear location, heat expansion in the gear mounting head causing additional backlash due to separation of the gears, and the like.

As for the screw feed type of tapping mechanism, regardless of precision and minimum backlash in the threading fit of the spindle in the nut, the latter soon wears appreciably, permitting a backdraft of the tap's cutters on the retractile or out stroke. Resultant machining or rubbing on the cutter formations tends to damage the same, requiring frequent grinding. This effect will arise in all types of screw advanced tapping heads in which the possibility exists of coaxial play or backlash between the spindle advancing threads of the screw and nut.

The result is a lack of precision in regard to when the tapping cut on the bore of the workpiece will actually commence, which cannot be countenanced in the machining of ball nut grooves, particularly in certain high precision products, and even in the tapping of highly accurate threads other than the ball nut type. It is of the greatest importance that there be an exactly uniform and high precision as to the location of the thread helix within each workpiece. This is to be distinguished from a mere precision as to the tap hole size.

Furthermore, it is very desirable, particularly in cutting special form helices other than standard form V-threads, to operate the tapping head in a very short in and out stroke which will enable the tap cutters to reach their full cutting depth very quickly in a minimum length of axial stroke. The obvious advantages of this reside in increased production output due to a shorter cycle time; and the tap is subjected on each stroke to a lesser wear time, prolonging the period between grindings.

However, the high cutting lead and heavy chip load in the tapping of a special thread incident to a short cutting stroke multiply the axial load on the spindle's guide-and-advancing nut and screw unit, thereby increasing wear on the latter and quick building up of the undesired backlash.

A similar consideration arises in regard to the driving connection at which the spindle shaft is rotatably driven, as from a splined connection to a gear. A conventional key type of spline gives rise, because of axial sliding friction and drag, to the imposition of additional axial load on the threaded spindle guide and advancing unit, aggravating wear at the latter.

It is therefore an object of the invention to provide a thread tapping unit, particularly for use in the high precision tapping of a ball nut thread such as will be described, but not necessarily limited thereto, which insures a repeatedly highly accurate commencement of the tapping cut on the bore of the workpiece, guaranteeing 100% uniformity of precision of the location of the thread in the bore, as required for this type of work; and which additionally insures a long life of operation of a set of taps, as well as infrequent grinding thereof. As an instance, there has been recording of as much as 540 operations of the rough tap before requiring grinding, 700 operations for the semi-finish tap and 500 operations for the finish tap.

Another object is to provide a thread tap mechanism guaranteeing the production of a highly accurate thread in extremely short in and out strokes. For example, in an actual operation on the type of workpiece hereinafter referred to, the tap reaches full cutting depth in a stroke as short as 1¾ inches. The mechanism of the invention permits such performance despite the heavy chip load and resultant axial load imposed upon the spindle feeding nut unit, due to the high cutting load, and despite the further additional torque imposed upon the spindle's drive connection also tending to increase this axial load.

More specifically, it is an object of the invention to provide a thread tapping mechanism in which the rotary tapping spindle is advanced axially through the agency of a pre-loaded ball nut type of guiding and feeding unit. Provision is made in this unit such that sets of balls helically traversing the unit between its thread and nut housing components are pre-biased axially toward one another, in one manner or another, under such axial pressure, as between the balls and the threading of screw and nut of the ball nut unit, that axial play or lash is totally eliminated. There thus results the extreme accuracy and precision as to commencement of the tapping cut which is requisite in the production of certain types of ball nut housing. Back drag on the tap due to lash in reversing the tap's rotation in pulling out of the work is eliminated, eliminating rubbing and wear on the tapping cutters which require frequent regrinding, hence producing an increased length of life of these expensive special tools.

Furthermore, in supplementation of the effects attributable to the pre-loaded, ball nut type of spindle feeding and advancing unit, the invention contemplates the use of a ball bearing spline connection between the tapping spindle and its driver, thus further reducing axial drag by minimizing friction at this torque connection.

Since extreme precision of feed of the tap by the pre-loaded ball nut unit would be of little value to the attainment of the intended end if the tap were not mounted with great precision relative to both the workpiece and the ball nut unit, not only in regard to axial distance from the ball nut thread but also in regard to angularity of the tap's cutters relative to the ball nut spindle, the invention also provides a tool set-up method or procedure insuring the necessary degree of accuracy in these respects.

In general, the invention comprises the provision of a thread tapping mechanism including a pre-loaded ball nut feed and advancing unit for the tap which, with the latter mounted with great precision relative to said unit and a workpiece, makes possible the performance of tapping operations with a precision, with an increase in tapping life and infrequency of grindings, despite heavy axial loads which are imposed at the spindle and advance unit, which can be obtained by no other type of feed and guide unit applicable to the purposes of a thread tapping device. This is true regardless of whatever degree of precision and close tolerance of interfit between other types of nut and screw components which may be attempted, for the simple reason that the closer and more precise such tolerance becomes, the greater becomes the degree of frictional wear under heavy axial load, hence of backlash at the nut and screw.

The foregoing as well as other objects will become more apparent as this description proceeds, especially when considered in connection with the accompanying drawing illustrating the invention, wherein:

FIG. 1 is a fragmentary side elevational view of the improved mechanism, schematic in nature in some respects, which is partially broken away and in vertical section to show the mount of the latter to a known type of tapping machine;

FIG. 2 is an end view in enlarged scale of the ball nut spindle guide and feed unit of the mechanism;

FIG. 3 is a fragmentary side elevational view, partially broken away and in vertical section, showing a high precision type of ball nut housing, as typically located accurately upon the work holder of the tapping machine for the production of an internal thread by the tapping mechanism of the invention; and FIG. 4 is a fragmentary view generally similar to FIG. 1, but showing the manner of mounting a tap to the ball nut spindle for extreme accuracy in regard to its operation on the workpiece, this view also showing certain outboard support means for guiding the tap axially in entering the workpiece.

Referring first to FIG. 3, the reference numeral 10 generally designates a ball nut housing which is provided with an internal helical thread 11 after being operated upon by the mechanism of the invention, typically in a three-tap progressive procedure. Actually, though it is of no particular significance to the invention, this housing is of substantially square external outline in a plane at 90° to the sheet. What is significant, for the purpose of the present description at least, is that it is provided with a series of rack teeth 12 formed to project from its lower surface, the spaces 13 between the two outer pairs of the four teeth shown being employed to fixedly and precisely locate the nut housing workpiece upon toothlike formations 14 of a mounting fixture 15 which is precisely located upon, and as a part of, the remainder of a work holder unit (not entirely shown) of the tapping machine which drives the mechanism of the present invention, generally designated by the reference numeral 16.

The purpose of this precise mount, in so far as the instant workpiece and the nut housing 10 produced therefrom, is to insure that the ultimate thread 11 of the latter shall be precisely located in regard to a certain reference point. Thus, considering FIG. 3 as being broken away and in axial section on a vertical plane precisely central of its side-to-side width, a 90° related vertical plane, represented by the dot-dash line "A," this plane being exactly centered endwise of the workpiece, should intersect the first mentioned plane at the precise midpoint of the space between the two internal teeth 12, and the helical thread 11 should, at the longitudinal center point of the workpiece, precisely span the reference point and plane A, as at the portion of the thread 11 which is specially designated 11' in FIG. 3.

It may be assumed that some further forming or machining operation is to be performed upon the nut housing 10 in relation to the reference points and planes referred to, not germane to the invention. However, FIG. 3 demonstrates the manner in which the workpiece is mounted or chucked for the tapping operation, and also serves to explain the need for extreme precision in repeated operations such as in regard to precise repeated commencement of the tapping cut which the improvements of the mechanism 16 make possible. FIG. 4 also deals with this desideratum.

The mechanism 16 generally comprises a ball nut spindle guide and advance unit 18, and a known type of ball nut spline 19. The reference numeral 20 designates a suitable chucking head fixedly applied to the screw shaft 21 of the unit 18, this screw member being threadedly received in the nut housing structure 22 of ball nut unit 18. Screw 21 serves as a spindle driving the head 20, in which a portion of a tap 23 is shown as being mounted, in the manner of FIG. 4.

As employed in the invention, the nut housing structure 22 comprises a pair of coaxial housing members 24, 25, each having an internal half helical thread, in a known manner, conventionally receiving balls traveling the helical grooving 26 of the screw 21. Likewise, each housing members 24, 25 is equipped with external recirculatory tubes 27 held in place in communication with the internal grooving of the parts by means of a screw-held clip 28.

The nut housing members are, in accordance with the invention, so positioned originally relative to one another that the balls circulating the internal grooving thereof are placed under axial load from the respective opposite axial directions sufficient to take up any tendency to axial play as engaged between the nut threading and the threading 26 of screw 21. Resilient packing rings 28' are interposed between the two nut parts 24, 25, being under axial compression in this pre-loaded condition of the latter; and the nut members 24, 25 are held in this accurately determined relative position in any suitable manner, as by means of a pair of conventionally indicated straps 29 bridging adjacent ends thereof and held in place by screws 30. A threaded connection is also possible.

The nut housing structure 22 is provided on one of its members 24 with a radially extending circumferential flange 32 which is fixedly and strongly clamped between the face of a housing member 33, through a bore of which the nut extends, and a further clamping housing 34, a series of bolts 35 holding the parts in place to provide the desired guiding and feeding mount for the ball nut and screw unit.

Thus, as rigidly mounted to the housing parts 33, 34, the ball nut housing 22 and its internal threading engaged by the helix 26 of screw 21 have an accurately predetermined and fixed relation, both axially and angularly, to the workpice 10, as the latter is accurately mounted in relation to the fixed work holder part 15. The ball nut and screw unit 16 as a whole is thus basically located with precision in relation to the workpiece at the commencement of working engagement of the tab 23 with the workpiece 10; and this precision is maintained in spite of repeated re-sharpenings or replacement of the tap, by the means to be described.

The screw 21 is provided with a rearward splined end 37 of reduced diameter, being driven at this portion while traveling on its axial in and out stroke through the agency of a ball bearing type spline 38 of conventional construction, featuring recirculatory balls 39 returned to internal axial grooves of nut 38 through end tubes 40, the balls 39 traveling the spline formations 41 in a known manner. Spline 38 is drivingly connected by a key 42 with a driving pinion or gear 43 journaled by ball bearings 44 in a fixed housing part 45. Gear 43 is in turn driven from an external power source by meshing gear means (not shown).

In order to render fully effective the action of the ball nut type feed provisions of the invention in attaining a repeated precision engagement with the workpiece 10, the invention contemplates the further provisions generally referred to above for the precise chucking of the tap 23 in its axially spaced relation to the ball nut unit 18 and to the workpiece, as well as its angular relation to the threaded screw 21 of the unit 18 and the workpiece. To this end, each tap is, prior to being placed in operation, subjected to certain precision type conditioning operations such as can best be understood by reference to FIG. 4 of the drawings, considered in conjunction with FIG. 1.

Thus, the chuck head 20, as rotatably and axially guided in a bushing 50 carried by a forward extension 51 of the housing part 34, has a forwardly opening bore 52 of a diameter to slidably receive an adapter 53 of generally cylindrical cross section, which serves as a mounting chuck for the tap 23. The base of the bore 52, or right-hand end as viewed in FIG. 4, is provided with a fixed central stop 54 which is in a predetermined fixed relation to the threading 26 of the ball nut spindle 21. The rear of the adapter 53 threadedly receives a stop plug 55 at the center thereof which is adapted to rearwardly abut the stop 54, thus inwardly limiting the position of adapter 53.

Thus an adjustment of the threaded plug 55 makes possible a precise adjustment in the axial direction of the chuck adapter 53 in relation to head 20 and the threading of ball nut unit 18. As thus precisely adjustable, the plug 55 is locked against further movement by means of a lock nut 56. Adapter 53 may be provided with a groove 57 receiving a series of dowels 58 for the non-rotative axial guidance of the adapter in its axial adjusting movement. A set screw 60 threaded at an angle into the wall of head 20 is engageable with a flat inclined surface 61 formed in adapter 53 to lock the latter rigidly and non-rotatably in position relative to head 20 when the stop plug 55 is in the desired position of adjustment and rearward engagement with head stop 54.

The adapter 53 is provided with a central, forwardly opening bore 62 receiving a rear shank portion 63 integral with tap 23; and the forward face of adapter 53 is milled and finished at 64 to provide a stop surface which, with the adapter 53 accurately and adjustably located in the head bore 52, will be at a predetermined axial distance from the threading 26 of ball nut spindle or screw 21, because of the adjustable stop provisions mentioned above. Forward of its bore 62, the adapter 53 is formed to provide a lip extension 65; and this extension is milled and finished to provide a flat surface 66, for a purpose to be described.

Somewhat to the rear of its cutting length, generally designated 68 (including the forward lead taper merging into a full diameter rear portion), the tap 23 carries an integral shoulder 69; and it is by a precise machining of this shoulder for engagement rearwardly with the face surface 64 of adapter 53 and radially with the flat surface 66 of the adapter that the desired, unfailingly accurate commencement of the tapping of the workpiece 10 is obtained.

Thus, it is of the essence of the invention that the rear face 70 of the tap's shoulder 69, as abuttingly engaged and rearwardly sustained by the finished adapter face 64, shall be an exact distance "B" (FIG. 4) from a certain point on the workpiece 10, represented by the vertical reference plane "A" at which, in the instanced tooth carrying workpiece, it is desired that the thread 11 of the latter shall at 11' predeterminedly and exactly span its longitudinal and transverse center lines. For example, this axial distance "B" might be held within as close a tolerance as 0.0001 inch. Naturally, the particular reference plane in question will vary in accordance with the nature of the workpiece. However, the reference characteristics mentioned above will serve for purposes of illustration.

It is known that at the extreme forward end of the instroke of the chuck head 20 to bring the tap 23 into initial tapping engagement with the workpiece, the forward finished surface 64 of adapter 53 will be a certain exact distance from the fixed workpiece support 15 and workpiece 10 mounted thereon, hence the distance "B" from the reference plane "A." It is then necessary to mill or grind the face 70 of the tap shoulder 69 so that, as abutted rearwardly against adapter surface or shoulder 64, it will cause the tap 23 to be correspondingly located precisely in the axial direction relative to the reference plane "A," always assuming that the adapter 53 is precisely located in chuck head 20 to preserve the dimension "B" within a 0.0001 inch tolerance at the forward end of the tapping stroke.

It is, as indicated above, also important that the cutting elements of the tap 23 shall also be precisely oriented in the angular sense in relation to the ball nut thread 26, in order that the cutting shall invariably commence at precisely the same time on the workpiece; and this is the reason for the provision of a flat reference surface 66 on adapter 53.

Thus, each time a tap 23 is fitted to the chuck head 20 of the equipment, the shoulder 69 thereof is also milled at 72, in addition to milling its rear surface 70, to provide a flat bottom surface for flatwise engagement with the adapter surface 66. Surface 72 is precisely oriented angularly relative to the axis of the tap and relative to the rear surface 70.

Accordingly, assuming only that the adapter 53, as non-rotatively guided into the head 20 by the dowels 58, is precisely located axially relative to the head, insurance is had that, with the workpiece 10 precision-located in reference to the tooth formations 14 of the work holder 15, the tap will develop a nut helix 11 which will at 11' (FIG. 3) precisely span a given reference characteristic at "A" of the workpiece 10. So far as the tap 23 and adapter 53 are concerned, it only remains to assemble and clamp them together, as by means of a set screw 74 threaded radially into the wall of the adapter to clampingly engage an inclined surface 75 milled on the tap shank 63. The dowels 58 and adapter-tap surfaces 66, 72 preserve the desired angularity of the tap in relation to chuck head 20 and ball nut threads 26.

The tap and adapter being thus prepared, the threaded stop plug 55 of the latter is manipulated to adajust it so that the adapter, with plug 55 rearwardly abutting the stop 54 of head 20, will set up or maintain the intended axial dimension "B" when the head 20 is at the forward extremity of its stroke. This adjustment can be made readily and accurately by means of a gauge, since the then distances from the forward end of the head's stop 54 to the plane "A" is known; hence adjusting plug 55 is set by reference to the gauge so that the overall length from it to the tap abutting surface 64 is equal to the known distance from the stop 54 to plane "A," minus the known distance "B."

The workpiece 10 is clamped in place on the work holder structure by means of a vertically acting upper jaw 76. In order to prevent any tendency of the cutter portion 68 of tap 23 from being sprung in the radial direction upon entering the bore of the workpiece, as by encountering a relative hard formation of the metal, the tap carries an elongated pilot nose 78 which is axially receivable in an elongated cylindrical bushing 79 mounted on ball bearings 80 in a suitable outboard structural portion 81 fixedly associated with the work holder structure. The length of pilot nose 78 is such that it enters the bushing 79 of this outboard fixture prior to engagement of the cutter portion 68 of tap 23 with a bore of the workpiece 10.

It is seen that, by the driving of the tap 23 through the specially pre-loaded ball nut unit 18, with the screw 21 operated under minimum axial drag under heavy torque at the ball type spline 38, and with the tap 23 precision-located angular-wise and axial-wise relative to the workpiece 10 and the ball nut thread 26, the mechanism 16 is enabled in a stroke of extremely short axial length to tap a ball nut or like housing 10 in a very precise manner. This is due to the elimination of axial lash or play, such as in all other types of thread tapping mechanisms of which I am aware causes early wear at the threaded spindle guide and advance unit. This in turn results in a lack of precision as to the commencement of actual cutting action on the workpiece, and further occasions undue tap wear detrimental to the life of expensive precision taps. The invention lends itself to high speed production by reason of the short stroke characteristic, yet avoids, as the result of heavy axial cutting load thus imposed, the effect of thread wear which would render the above advantageous results impossible of attainment.

What I claim as my invention is:

1. A mechanism of the type described, comprising a work holder, a rotary spindle having chuck means for receiving and driving a tool in forming engagement with a workpiece held by said work holder, and means for threadedly driving said spindle axially and rotatively while insuring precise forming engagement of said tool with the workpiece in a working stroke in engagement with the latter, comprising a screw to feed said spindle and a nut threadedly engaging said screw, said chuck means comprising a chuck head in fixed axial and angular relation to said screw, said chuck head and nut being in a precisely predetermined axial and angular relation to said work holder at the commencement of working engagement of said tool with the workpiece, an adapter mounted on said head, said adapter fixedly mounting said tool, and means to adjust precisely the axial relationship of the adapter and head to one another, thus to adjust precisely the axial spacing of said adapter from said work holder at the commencement of a working stroke of the tool in engagement with the workpiece, said adapter having means holding the same in predetermined fixed angular relation to said chuck head in a precisely adjusted axial relation of said adapter and head to one another, said adapter and tool having means to hold the same in a fixed axial and angular relationship to one another and to said chuck head and screw.

2. A thread tapping mechanism comprising a work holder, a rotary spindle having chuck means for receiving and driving a thread cutting tap in thread forming engagement with a workpiece held by said work holder, and means for threadedly driving said spindle axially and rotatively while insuring precise commencement of tapping engagement of said tap with the workpiece, comprising a ball nut unit including a helical screw to feed said spindle and a ball nut threadedly engaging said screw, said chuck means comprising a chuck head in fixed axial and angular relation to said screw, said chuck head and nut being in a precisely predetermined axial and angular relation to said work holder at the commencement of tapping engagement with the workpiece, an adatper mounted on said head, said adapter fixedly mounting said tap, and means to adjust precisely the axial relationship of the adapter and head to one another, thus to adjust precisely the axial spacing of said adapter from said work holder at the commencement of tapping engagement with the workpiece, said adapter having means holding the same in predetermined fixed angular relation to said chuck head in a precisely adjusted axial relation of said adapter and head to one another, said adapter and tap having means to hold the same in a fixed axial and angular working relationship to one another and to said chuck head and screw.

3. A thread tapping mechanism comprising a work holder, a rotary spindle having chuck means for receiving and driving a thread cutting tap in thread forming engagement with a workpiece held by said work holder, and means for threadedly driving said spindle axially and rotatively while insuring precise commencement of tapping engagement of said tap with the workpiece, comprising a ball nut unit including a helical screw to feed said spindle and a ball nut threadedly engaging said screw, said screw and nut being under axial pre-load to eliminate axial play between the same, said chuck means comprising a chuck head in fixed axial and angular relation to said screw, said chuck head and nut being in a precisely predetermined axial and angular relation to said work holder at the commencement of tapping engagement with the workpiece, an adapter mounted on said head, said adapter fixedly mounting said tap, and means to adjust precisely the axial relationship of the adapter and head to one another, thus to adjust precisely the axial spacing of said adapter from said work holder at the commencement of tapping engagement with the workpiece, said adapter having means holding the same in predetermined fixed angular relation to said chuck head in a precisely adjusted axial relation of said adapter and head to one another, said adapter and tap having means to hold the same in a fixed axial and angular working relationship to one another and to said chuck head and screw.

4. A thread tapping mechanism comprising a work holder, a rotary spindle having chuck means for receiving and driving a thread cutting tap in thread forming engagement with a workpiece held by said work holder, and means for threadedly driving said spindle axially and rotatively while insuring precise commencement of tapping engagement of said tap with the workpiece, comprising a ball nut unit including a helical screw to feed said spindle and a ball nut threadedly engaging said screw, said chuck means comprising a chuck head in fixed axial and angular relation to said screw, said chuck head and nut being in a precisely predetermined axial and angular relation to said work holder at the commencement of tapping engagement with the workpiece, an adapter mounted on said head, said adapter fixedly mounting said tap, and means to adjust precisely the axial relationship of the adapter and head to one another, thus to adjust precisely the axial spacing of said adapter from said work holder at the commencement of tapping engagement with the workpiece, said adapter having means holding the same in predetermined fixed angular relation to said chuck head in a precisely adjusted axial relation of said adapter and head to one another, said adapter and tap having means including pairs of interengaging abutment surfaces to hold the same in a fixed axial and angular working relationship to one another and to said chuck head and screw.

5. A mechanism of the type described, comprising a work holder, a rotary spindle having chuck means for receiving and driving a tool in forming engagement with a workpiece held by said work holder, and means for threadedly driving said spindle axially and rotatively while insuring precise forming engagement of said tool with the workpiece in a working stroke in engagement with the latter, comprising a screw to feed said spindle and a nut threadedly engaging said screw, said work holder having means to hold the workpiece in precisely fixed and invariable axial and angular relation thereto and to said nut at the commencement of and during said working engagement, said chuck means comprising a chuck head in fixed axial and angular relation to said screw, said chuck head and nut being in a precisely predetermined axial and angular relation to said work holder at the commencement of working engagement of said tool with the workpiece, an adapter mounted on said head, said adapter fixedly mounting said tool, and means to adjust precisely the axial relationship of the adapter and head to one another, thus to adjust precisely the axial spacing of said adapter from said work holder at the commencement of a working stroke of the tool in engagement with the workpiece, said adapter having means holding the same in predetermined fixed angular relation to said chuck head in a precisely adjusted axial relation of said adapter and head to one another, said adapter and tool having means to hold the same in a fixed axial and angular relationship to one another and to said chuck head and screw.

6. A thread tapping mechanism comprising a work holder, a rotary spindle having chuck means for receiving and driving a thread cutting tap in thread forming engagement with a workpiece held by said work holder, and means for threadedly driving said spindle axially and rotatively while insuring precise commencement of taping engagement of said tap with the workpiece, comprising a ball nut unit including a helical screw to feed said spindle and a ball nut threadedly engaging said screw, said work holder having means to hold the workpiece in precisely fixed and invariable axial and angular relation thereto and to said nut at the commencement of and during said tapping engagement, said chuck means comprising a chuck head in fixed axial and angular relation to said screw, said chuck head and nut being in a precisely predetermined axial and angular relation to said work holder at the commencement of tapping engagement with the workpiece, an adapter mounted on said head, said adapter fixedly mounting said tap, and means to adjust precisely the axial relationship of the adapter and head to one another, thus to adjust precisely the axial spacing of said adapter from said work holder at the commencement of tapping engagement with the workpiece, said adapter having means holding the same in predetermined fixed angular relation to said chuck head in a precisely adjusted axial relation of said adapter and head to one another, said adapter and tap having means to hold the same in a fixed axial and angular working relationship to one another and to said chuck head and screw.

7. A thread tapping mechanism comprising a work holder, a rotary spindle having chuck means for receiving and driving a thread cutting tap in thread forming engagement with a workpiece held by said work holder, and means for threadedly driving said spindle axially and rotatively while insuring precise commencement of tapping engagement of said tap with the workpiece, comprising a ball nut unit including a helical screw to feed said spindle and a ball nut threadedly engaging said screw, said work holder having means to hold the workpiece in precisely fixed and invariable axial and angular relation thereto and to said nut at the commencement of and during said tapping engagement, said chuck means comprising a chuck head in fixed axial and angular relation to said screw, said chuck head and nut being in a precisely predetermined axial and angular relation to said work holder at the commencement of tapping engagement with the workpiece, an adapter mounted on said head, said adapter fixedly mounting said tap, and means to adjust precisely the axial relationship of the adapter and head to one another, thus to adjust precisely the axial spacing of said adapter from said work holder at the commencement of tapping engagement with the workpiece, said adapter having means holding the same in predetermined fixed angular relation to said chuck head in a precisely adjusted axial relation of said adapter and head to one another, said adapter and tap having means including pairs of inter-engaging abutment surfaces to hold the same in a fixed axial and angular working relationship to one another and to said chuck head and screw.

References Cited in the file of this patent

UNITED STATES PATENTS

| | | |
|---|---|---|
| 857,151 | Booth | June 18, 1907 |
| 1,064,219 | Hirsch et al. | June 10, 1913 |
| 2,182,411 | Rosenberg et al. | Dec. 5, 1939 |
| 2,340,874 | Garand | Feb. 8, 1944 |
| 2,470,218 | McNamara | May 17, 1949 |
| 2,810,584 | Slotta | Oct. 22, 1957 |
| 2,905,008 | Sears | Sept. 22, 1959 |
| 2,945,366 | Sears | July 19, 1960 |
| 3,059,494 | Grabowski et al. | Oct. 23, 1962 |